Patented Feb. 1, 1949

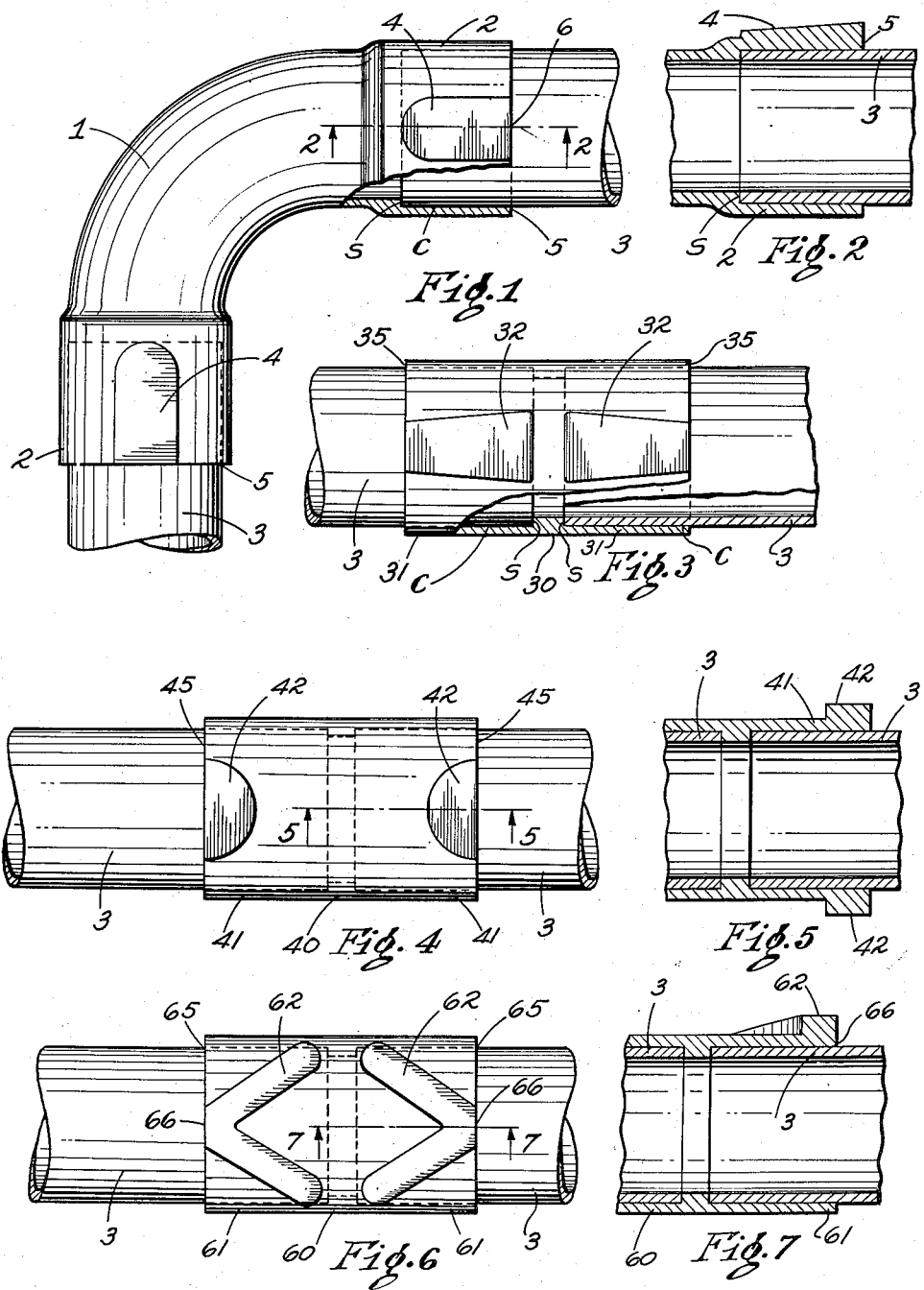

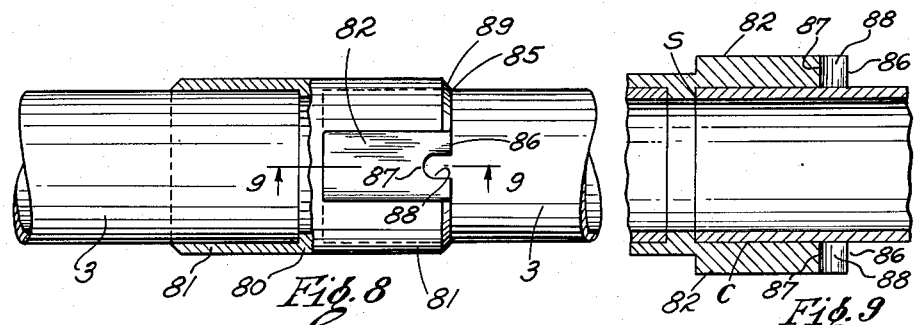
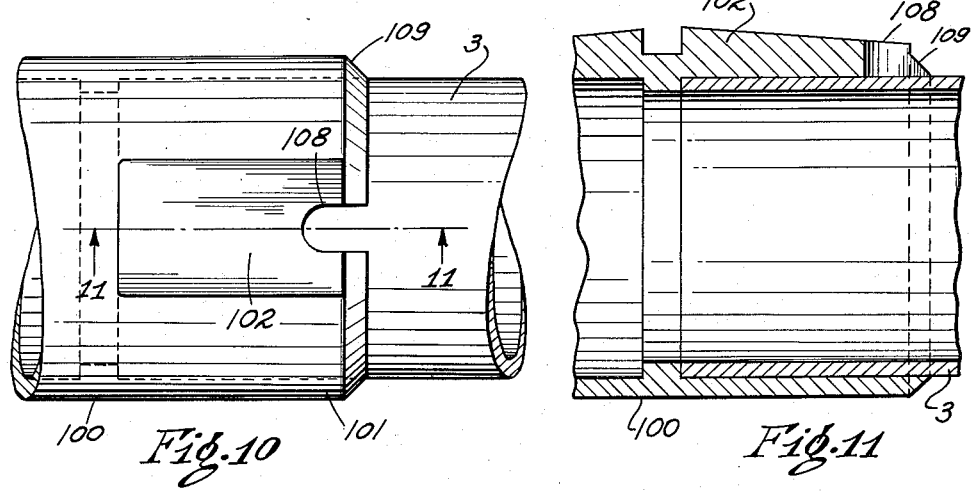
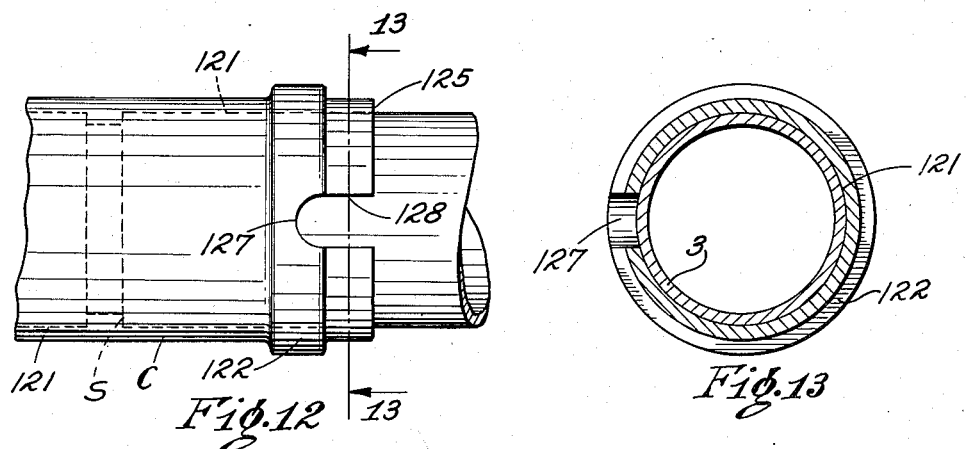

2,460,665

UNITED STATES PATENT OFFICE 2,460,665

SOLDER FITTING

Paul D. Wurzburger, Cleveland Heights, Ohio

Application July 8, 1944, Serial No. 544,061

4 Claims. (Cl. 285—115)

This invention relates to the art of capillary joints and fittings and more particularly to such joints and fittings in which the parts are joined by the influence of heat and capillary action on a bonding material such as solder.

Reference is made to my copending applications, Serial Number 548,327, filed August 7, 1944, Serial Number 559,171, filed October 18, 1944, and Serial Number 559,172, filed October 18, 1944, containing common and/or related subject matter.

Fittings and joints of the general type to which my invention relates have been well known in a number of forms and have presented problems which prior to my invention have been persisted without satisfactory solution. These problems take various aspects. While it has been known that it is desirable to feed bonding material such as solder to the joints while the metallic parts are at temperatures not greatly in excess of melting point of the bonding material, it has been impracticable to follow this desirable practice because of the tendency of the parts to cool rapidly while melting the solder on the one hand and conducting it into the capillary space or spaces on the other hand. The obvious course of increasing the bulk and size of the fittings to provide greater heat capacity carries with it the obvious and concomitant waste of material for other purposes, and gravely increases the cost of the fitting parts, making such a course especially impracticable and costly where the fittings are sought to be made of wrought stock rather than castings or forgings. This phase of the problem also has a critical aspect in the recognized undesirability of applying heat to the fitting during the time the solder or other bonding material is being introduced into the capillary joint space. This is evidenced in the awkwardness of the operation, the practical loss of temperature control and the probability of oxidizing the solder in the joint. A companion difficulty was that of reheating an incompleted joint where the heat content of the parts was insufficient to induce the complete filling of the capillary space with the heat available in the first instance. It was no answer to heat the parts to higher temperatures before presenting the solder or other plastic bonding materials because that would encourage the tendency to burn and oxidize the solder in the first instance rather than in the repetition of the initial failure as mentioned above.

Another aspect of the problem may be stated in the relation of the size of the capillary space to the temperature at which solder or other bonding agent will flow therein on the one hand and the strength of the bond as measured in terms of the thickness of the capillary joint on the other hand. Generally speaking it has been understood and appreciated that thinner capillary spaces, of the order of one to two thousandths of an inch, produce bonds of higher strength than thicker capillary spaces of the order of five to six thousandths of an inch, but the thinner spaces could only be satisfactorily filled with a bonding agent at substantially higher temperatures than the thicker spaces, and the maintenance of a higher temperature necessary to fill the thinner space was much more difficult to maintain and control without burning the solder or flux on the one hand or failing to fill the whole space on the other hand. Generally speaking the art has compromised with these dilemma as by heating the fittings and tubes to higher temperatures than were known to be desirable in the first instance, thus risking burning the solder and flux for the purpose of having enough calories available to melt and draw in the last necessary increment of solder. Similarly the art has used thicker capillary spaces than it knew to be desirable for maximum mechanical strength and fluid sealing properties for the reasons mentioned above.

Another particular problem or particular aspect of the general problem here discussed which the art has long recognized and endured without satisfaction has had to do with single point feeding of the solder or bonding material. Especially where solder is brought to the annular opening of the capillary space in the solid form it has had contact with the tube and the end of the socket essentially at one point which of necessity is the point where heat is radiated most rapidly from metallic parts because the solder has a greater capacity for receiving heat than the air in contact with the other portions of the tube and fitting. Consequently the point where heat was most needed always tended to be most deficient as heat was taken from this point to melt the solder and/or to heat and conduct the solder from the point of contact to the ramifications of the capillary space. If the operator elected to apply the solder at different points around the entry to the capillary space or around the zone of juncture between the socket and the tube to avoid the difficulty above mentioned, he lost the advantage of being able to know from the appearance of other points of the zone of juncture whether or not the capillary space had been properly filled. This phase of the problem was also aggravated as the art came to appreciate the advantage, for some purposes, of reducing the thickness of the socket around the exterior zone of juncture between the socket and the tube to increase the cooling thereof for the purpose of preventing the out-flow of solder from the capillary space. The dilemma here in this last instance was that one could not have the advantage of rapid cooling of the zone of juncture on the one hand and the advantage of point feeding from the same zone of juncture on the other hand. Feeding from a point remote from the zone of juncture has been practiced in the art but this alone did not escape the inevitable consequence of cooling the feeding point more rapidly than other parts adjacent the capillary space.

Other phases of the problems are also known and understood in the art and will suggest themselves from the foregoing outline and discussion taken with the following description of the solution thereof which I have accomplished through my invention. It is among the objects of my invention to provide a practicable economical and commercially satisfactory solution to the problems above stated and discussed. More particularly it is among the objects of my invention to provide fittings of the type discussed which will facilitate and insure the making of better and stronger capillary joints; that will facilitate the joining of tubes or pipes and appropriate fittings with greater facility and greater certainty that the same will be mechanically strong and hydraulically tight, and can be made satisfactorily with the exercise of least precision and care and the least compromise between the dilemma above stated and with less yielding to known undesirable practices to avoid more undesirable results. It is among the objects of my invention to provide a solder or brazing fitting in which all necessary and desirable heat capacity for all practical purposes will be provided and maintained at the desired point or parts of the joint to facilitate the melting of the solder and the flashing or spreading thereof in a desirable and controlled way throughout the capillary space so as to fill that space and all the necessary parts thereof quickly and completely, and to so provide the necessary and desirable heat at temperatures not substantially exceeding the temperatures desirably applied to the solder, and not so excessively above desirable temperatures as to jeopardize the joint. Another object is to provide desirable heat capacity in the socket part of the joint without greatly or substantially adding to the mass or cost thereof and to so dispose and control the utilization of the heat capacity as to facilitate the use of thinner capillary spaces and gain the advantage of stronger joints thereby also to conserve the expenditure of solder or other bonding material in making joints. Another object is to provide a reservoir of heat which will aid the flow of solder or plastic material to those parts of the structure where flow is desired and often difficult to obtain.

Other objects will appear from the following description of preferred and certain modified forms of my invention reference being had to the accompanying drawings in which Figure 1 is a plan view showing a section of my fitting in the elbow form with socket parts at each end receiving tubes therein; Figure 2 is a section along the lines 2—2 of Figure 1; Figure 3 is a partially sectioned viewed of a modified form of my invention in the straight coupling form; Figure 4 is an exterior view of another modified form of my invention in the straight coupling form; Figure 5 is a section taken along the line 5—5 in Figure 4; Figure 6 is a view similar to Figures 3 and 4 of a further modified form of my invention; Figure 7 is a view taken along the lines 7—7 of Figure 6; Figure 8 is a partially sectional exterior view of another modified form of my invention shown partially in section; Figure 9 is a sectional view along the line 9—9 of Figure 8; Figure 10 is an elevation of a further modified form of my invention; Figure 11 is a section taken along the line 11—11 of Figure 10; Figure 12 is an exterior elevation of another modified form of my invention, and Figure 13 is a transverse section along the line 13—13 of Figure 12.

In Figure 1 my invention is shown as embodied in an elbow fitting 1 which elbow form will be taken as illustrative of different forms of fittings such as T's, crosses, couplings, straight fittings and the like. My invention is more particularly illustrated and embodied in conjunction with the tube receiving socket parts 2 disposed at the open ends of the elbows which receive tubes or pipes 3 in a telescopic relationship; the ends of the pipes 3 preferably entering the sockets 2 to contact with internal shoulders S between which and the open outer ends 5 of the sockets there is afforded an annular substantially cylindrical capillary space C into which solder or other bonding material is to be drawn when sufficient heat is provided to effect a capillary flow and distribution thereof. The circular terminus 5 of the open outer end of the socket adjacent the outer surface of the tube 3 may appropriately be termed the line of juncture of the parts, defining as it does, the exposed end of the capillary space and presently of the bonding joint formed therein. Charateristic of my invention is the heat reservoir 4 which is formed preferably integrally, exteriorly of the socket part 2 of the fitting and takes the form of an external rib or thickened portion, see also Figure 2, having a limited circumferential extent and preferably extending longitudinally of the socket part substantially from the open end of the socket rearwardly to about the plane of the shoulder S, through a limited circumferential area. Preferably, as shown in Figure 2, the heat reservoir or rib 4 is substantially thicker than the circumferentially adjacent wall of the socket 2 and in this form it will be seen that the portion of the rib 4 adjacent the line of juncture 5 may be somewhat deeper than the portion of the rib more nearly adjacent the shoulder S. I also prefer, where practicable, to buff or polish the external surface of the rib 4 to inhibit heat radiation therefrom.

In the practice of my invention as illustrated particularly in Figures 1 and 2, heat is applied to the socket part 2 and to the heat reservoir 4 thereof after the tube 3 has been positioned substantially as shown within the socket, i. e., in the position in which it is intended to be secured therein. It will be understood that the materials of which the tube and socket are made will comprehend those metals commonly used in the art such as copper and its well-known alloys of brass and bronze, and that the heating thereof may be done with any desired means including the familiar blow-torch well-known to those skilled in this art. The heating of the assembled parts is preferably done until the parts including the heat reservoir 4 have been raised to a temperature not greatly in excess of that necessary (a) to melt solder when in the familiar solid or wire form and cause it to flow into the capillary space C between surfaces of the tube and socket or (b) to induce the capillary flow of solder or other bonding material if it is to be introduced to the fitting and space C in liquid or non-solid form. When the parts are so heated the solder is preferably introduced to the joint at the point 6 at the end of the rib or heat reservoir 4 adjacent the open end of the capillary space and line of juncture 5. Here by the mass and shape of the rib 4 I have provided relatively great heat capacity, i. e., the greatest number of calories, at the point where the utility and consumption of heat is greatest and most desired to melt the solder and/or to heat it to that condition of fluidity incident to its "flashing" or flowing into the capillary space C. It will also be observed that the reservoir 4 running longitudinally of the socket provides a continuing source of heat throughout its length which I believe tends to cause the solder to flow longitudinally to the extreme inner end of the capillary space adjacent the shoulder S at least as rapidly if not more rapidly than it tends to flow circumferentially from the point 6. By this means I have extra assurance of complete longitudinal and circumferential disposition and flow of the solder especially at the inner end of the tube where its presence is not so readily ascertained as by observation around the line of juncture 5. While I have not mentioned especially the matter of providing appropriate flux and cleaning the parts incident to the soldering operation, I take it that such things go without saying because the necessity and desirability thereof is so well understood and practiced in the art.

The mass of the rib or reservoir 4 in relation to the other portions of the socket end 2 and the particular form thereof may be varied within reasonable limits as will be illustrated and discussed more particularly below. The proportions shown in Figures 1 and 2 have been found to be satisfactory for my use and purposes where the rib is generally about twice as thick as the adjacent walls of the socket, see Fig. 2, and extends circumferentially substantially as shown in Fig. 1. The underlying thought is that the rib or reservoir 4 while contributing but a relatively small mass to the socket as a whole contributes enough at the point where the heat is most to be desired to serve substantially the function of a soldering iron for the time and under the circumstances necessary to do the work.

In Figure 3 a straight coupling 30 embodying my invention in slightly different form is shown receiving tubes 3 against interior shoulders S within socket portion 31 which define annular capillary spaces C in much the same way as above described. Here however the ribs or reservoirs 32 running longitudinally from the open ends 35 of the coupling back to about the planes of the shoulders S while comprising raised or thickened rib portions of limited circumferential extent, are wider as they approach the inward parts of the coupling adjacent the shoulders S than they are adjacent the open ends 35 of the sockets 31. In this form the ribs or reservoirs 32 may be of uniform depth throughout their longitudinal extent or may be of greater depth from the open ends of the sockets decreasing to the rearward and wider ends of the ribs as may be desired.

In this form I believe that the greater circumferential width of the ribs adjacent to shoulders S tends to facilitate the circumferential flow of solder from the zone of the ribs a little more fully adjacent the shoulders S than in the form disclosed in Figures 1 and 2. Where very thin capillary spaces are employed to obtain especial strength in the bonded joints, ribs or reservoirs taking the form shown in Figure 3 may well assure a better flow and disposition of the solder in the inward parts of the socket.

In the embodiment of my invention shown in Figures 4 and 5 the coupling 40 receiving the tubes 3 may be much the same as the coupling 30 described in Figure 3 except that I have herein illustrated the heat reservoirs or ribs 42 as of limited longitudinal extent and somewhat greater circumferential extent adjacent the open ends 45 of the sockets. The reservoirs 42 may be of uniform depth and substantially semicircular shape and of depth substantially twice the thickness of the adjacent walls of the sockets 42, see Figure 5. Here as will appear, especially in Figure 5, I have provided reservoirs 42 on diametrically opposite sides of the sockets 41 to illustrate my thought that any socket embodying my invention may be provided with more than one heat reservoir or rib or thickened portion for the purposes I have described both for the sake of adding heat capacity generally to a desirable part or to desirable parts out of the socket, and also to make available more than one particular point where the solder may be conveniently introduced to the capillary space. Since it so happens that solder must be applied to fittings that are located in awkward corners and relatively inaccessible places I contemplate the provision of more than one rib or reservoir for each socket preferably on opposite sides thereof for the sake of accessibility. While the reservoirs 42 illustrated in Figures 4 and 5 fail to extend the full length of the capillary space still their functions and advantages are only modified in degree to this extent. This form of rib or reservoir commends itself especially in point of economy of manufacture where it may be easily formed by an upsetting or forging process.

The modified forms of ribs 62 illustrated in Figures 6 and 7 formed on the socket part 61 of the straight coupling 60 which may receive the tube ends 3 in capillary relation to the sockets 61 much as above described, are shown in the V shaped form with the bases of the V's at the open ends 65 of the sockets so that the solder may be introduced to the capillary space at substantially points 66 and encouraged to flow inwardly out of sockets and circumferentially thereof in a manner and with the advantages mentioned in the description of the tapered ribs 32 shown in Figure 3. The ribs or reservoirs 62 may be of uniform depth or may be of greater or lesser depth at different parts of their helical extent depending upon the circumstances of their use and application. I have found that the V shape form of the ribs or reservoirs 62 may have a special advantage where the parts are large, i. e., in larger diameter fittings for larger diameter tubes, and where the quantity of solder or other bonding material required to fill all of the capillary space is great in respect to the whole mass of the parts embracing and defining the capillary space.

In Figures 8 and 9 the coupling 80 receiving the ends of the tubes 3 in sockets 81 is intended to be much the same as the coupling hereinabove described in its general aspects and functions.

Here, however, I provide heat reservoirs or ribs 82 preferably extending from the open ends 85 of the socket to the planes of the shoulders S and of substantially uniform circumferential width and preferably of uniform depth. In this embodiment of my invention a slot, notch or aperture 88 is cut or formed in the rib 82 throughout the full depth of the rib from its extreme forward end 86 rearwardly into the body of the rib and socket to a substantially semi-cylindrical radial terminus 87. Preferably the slot 88 has a circumferential width substantially equal to the diameter of the solder rod intended to be applied to the joint to provide the filling for capillary space C. In this form the solder wire or rod is preferably warmly and closely contacted with the walls of the slot 88 including the inner semi-cylindrical terminus thereof so that a substantial portion of the wire may be rapidly heated from the heat contained in the reservoir 82 and delivered to the solder wire not only at its extreme end but also around the sides thereof. The slot 88 will also guide and locate the wire aiding the operator in his application thereof and steadying the end of the wire against slipping or sliding from the point of its best and intended place of contact. In this form of my invention I also prefer to chamfer the external wall of the sockets 81 as at 89 whereby to induce the most rapid cooling of the whole assembly adjacent the line of juncture 85 to inhibit the flow of fluid solder out of the capillary space beyond the line of juncture. Such chamfer per se is not novel with me but it is new and useful, as I have found, to provide a heat reservoir or rib 82 longitudinally of the socket extending through and/or into the zone of the chamfer 89 to facilitate entry of the solder or plastic material into the capillary space.

Figures 10 and 11 show an acceptable variation of the form of Figures 8 and 9 wherein the coupling 100 differs from the coupling 80 essentially in the form of the ribs or reservoirs 102 in which slots 108 may be similar to slots 88 except as they are a little deeper longitudinally to permit the chamfer 109 to be carried all around the ends of the sockets 101 whereby to facilitate the machining thereof. The ribs 102 are shown as increasing in height from the outer to the inner parts of the socket to accentuate the heating of the inner parts of the socket in contrast to cooling the extreme outer parts as by the chamfers 109. In the forms of my invention where all or part of the open end of the socket at the circumferential line of juncture is chamfered or formed to constitute an exterior cooling zone, it will be seen that the slots or notches extend into the ribs or heat reservoirs inwardly beyond or both longitudinally and circumferentially away from the cooling zones into the hot bodies of the ribs in interior hot zones of the ribs and sockets. Thus the bonding material may be introduced to the capillary space at a desirably hot spot or place whilst the outflow of bonding material from the capillary space at the open end of the socket is inhibited.

In Figures 12 and 13 a further modification is shown that is particularly well adapted to wrought fittings wherein the rib or heat reservoir 122 takes an annular form of limited longitudinal extent, preferably spaced inwardly from the open end 125 of the socket part 121. The annular form of rib is susceptible of easy manufacture in the wrought fitting as by upsetting the wall of the socket at or about the time that the sockets 121 and shoulders S are formed or given their finished contours. A solder feeding slot 128 extends through the wall of the socket part from the open end 125 into the rib 122, preferably terminating within the rib in a semi-cylindrical radially disposed terminus 127 proportioned to have intimate contact with the solder rod or wire and to supply the bonding material to fill the capillary space C as above described. While the rib 122 in the annular form is not disposed to extend all the way back to the shoulder S, still it does provide an annular reservoir of heat to facilitate circumferential capillary flow directly. Moreover the heat contained in the rib 122 is available to flow to all other adjacent parts of the socket and preserve the other parts of the socket against detrimental loss of heat which they would otherwise be compelled to give up to melt or heat the solder at its point of contact with the fitting and entry into the capillary space. The annular reservoir 122 thus performs essentially the same functions as the longitudinally disposed reservoirs although it may be considered that certain of the functions are performed directly in one form while being performed indirectly in other forms.

While I have illustrated and described preferred and certain modified forms of my invention and endeavored to teach the best embodiments and practices thereof now known to me, changes, improvements and modifications thereof will occur to those skilled in the art without departing from the precepts and teachings hereof, and I do not care to be limited to the particular forms specifically disclosed herein or in any manner other than by the claims appended hereto.

I claim:

1. A fitting for a capillary joint having a socket adapted to receive through the open end thereof a tube or member telescopically with capillary space for bonding material between the interior surface of the wall of the socket and the exterior surface of the said tube or member, part of the said wall of the socket comprising at least one thickened portion, a greater part of the said wall including at least a portion of said wall near the said open end of the socket being substantially thinner than said thickened portion, said thickened portion having appreciably greater mass and heat capacity per unit of wall area than said thinner part of the wall, said thickened portion being disposed in the wall of the socket adjacent an exposed edge of said capillary space to provide a feeding point for bonding material.

2. The fitting according to claim 1 in which said feeding point is spaced from the open end of the socket and has a configuration adapted to receive the end of a rod of bonding material.

3. The fitting according to claim 1 in which said thickened portion takes the form of an elongated rib at least as long as the length of the socket and extends away from said feeding point to a point in the socket remote therefrom.

4. The method of making a capillary joint between a fitting having a socket and a tube or member telescopically inserted through the open end of the socket with capillary space for bonding material between the interior surface of the wall of the socket and the exterior surface of said tube or member wherein part of the wall is thickened and another part of the wall including at least a greater part of said wall adjacent the open end of the socket is substantially thinner than said thickened part, said thickened part overlying said capillary space and having at least a portion disposed adjacent a point where bonding material may be fed to said space and having appreciably greater heat capacity per unit of wall area than said other part of the wall, which method consists in heating the socket including the said thickened part of the wall thereof and the adjacent portions of said tube or member to a temperature not substantially in excess of that required to facilitate capillary flow of bonding material in and into said capillary space, discontinuing the application of heat, and then introducing non-molten bonding material to said space at said feeding point adjacent said thickened part of the wall of the socket and in heat receptive relation thereto whereby heat from said thickened part facilitates melting and flow of said bonding material.

PAUL D. WURZBURGER.

REFERENCES CITED

The following references are of record in the file of this patent:

UNITED STATES PATENTS

| Number | Name | Date |
|---|---|---|
| 2,113,060 | Sandberg | Apr. 5, 1938 |
| 2,224,145 | Dugan | Dec. 10, 1940 |

FOREIGN PATENTS

| Number | Country | Date |
|---|---|---|
| 435,070 | Great Britain | Sept. 13, 1935 |
| 444,817 | Great Britain | Mar. 27, 1936 |

OTHER REFERENCES

Bulletin No. 12-A, copyrighted 1943 by Handy and Harman Co., General Office: 82 Fulton St., New York, N. Y., pages 9, 13, and 16. (Copy in Div. 14.)